(12) United States Patent
Wescott et al.

(10) Patent No.: US 11,148,135 B2
(45) Date of Patent: Oct. 19, 2021

(54) FILTRATION COLUMN ASSEMBLY FOR DIAGNOSTIC ASSAY SYSTEM

(71) Applicant: Integrated Nano-Technologies, Inc., Henrietta, NY (US)

(72) Inventors: Nathaniel E. Wescott, West Henrietta, NY (US); Konstantin Aptekarev, Santa Cruz, CA (US)

(73) Assignee: Integrated Nano-Technologies, Inc., Henrietta, NY (US)

( * ) Notice: Subject to any disclaimer, the term of this patent is extended or adjusted under 35 U.S.C. 154(b) by 520 days.

(21) Appl. No.: 16/302,473

(22) PCT Filed: May 16, 2017

(86) PCT No.: PCT/US2017/032901
§ 371 (c)(1),
(2) Date: Nov. 16, 2018

(87) PCT Pub. No.: WO2017/201046
PCT Pub. Date: Nov. 23, 2017

(65) Prior Publication Data
US 2019/0293531 A1 Sep. 26, 2019

Related U.S. Application Data

(60) Provisional application No. 62/337,446, filed on May 17, 2016, provisional application No. 62/337,423, filed on May 17, 2016.

(51) Int. Cl.
*B01L 3/00* (2006.01)
*G01N 1/40* (2006.01)
*G01N 35/10* (2006.01)

(52) U.S. Cl.
CPC .......... *B01L 3/502* (2013.01); *B01L 3/502746* (2013.01); *G01N 1/4077* (2013.01);
(Continued)

(58) Field of Classification Search
CPC ....... B01L 2300/0681; B01L 2300/042; B01L 2300/046; B01L 2300/087; B01L 3/502
See application file for complete search history.

(56) References Cited

U.S. PATENT DOCUMENTS 7,858,363 B2    12/2010   Jia
2008/0020446 A1    1/2008   Jia
(Continued)

FOREIGN PATENT DOCUMENTS

CN    203513676 U    4/2014
CN    203960207 U    11/2014
(Continued)

OTHER PUBLICATIONS

PCT/US2017/032901, filed May 16, 2017; International Search Report dated Aug. 8, 2017, Integrated Nano-Technologies, Inc. (4 pages).
(Continued)

*Primary Examiner* — Sally A Merkling
(74) *Attorney, Agent, or Firm* — Barclay Damon LLP

(57) ABSTRACT

A filtration column assembly is provided for use in combination with a disposable cartridge of a diagnostic assay system. The filtration column assembly includes a column matrix material configured to filter a fluid sample, a tubular column configured to sealably engage a filtration chamber of the disposable cartridge and a cap configured to be inserted into an end of the tubular column and define a passageway to direct the sample fluid from the second end of the tubular column into a collection cavity disposed adjacent the filtration chamber. The tubular column defines (i) a column cavity for receiving the column matrix material, (ii) a first end having an opening for receiving the fluid sample and configured to retain the column matrix material, and (iii) a second end, receiving the fluid directing cap, and having an opening to dispense a filtered fluid sample from the column cavity.

20 Claims, 15 Drawing Sheets

(52) U.S. Cl.
CPC .... *G01N 35/1095* (2013.01); *B01L 2200/028* (2013.01); *B01L 2200/04* (2013.01); *B01L 2200/0631* (2013.01); *B01L 2300/042* (2013.01); *B01L 2300/0681* (2013.01); *B01L 2400/0487* (2013.01); *B01L 2400/0633* (2013.01); *G01N 2001/4088* (2013.01)

(56) References Cited

U.S. PATENT DOCUMENTS

2010/0222560 A1* 9/2010 Jia .................. C12N 15/101
                                                        536/23.1
2011/0300609 A1  12/2011 Lim
2014/0099646 A1   4/2014 Connolly et al.

FOREIGN PATENT DOCUMENTS

WO   2014-190249 A1   11/2014
WO   2014/190249 A1   11/2014

OTHER PUBLICATIONS

European Patent Office Extended Search Report, Application No. EP 17800012, dated Mar. 6, 2019 (9 pages).
Australian Government Intellectual Property Office, Examination Report No. 1; dated Jun. 18, 2021; (4 pages).

* cited by examiner

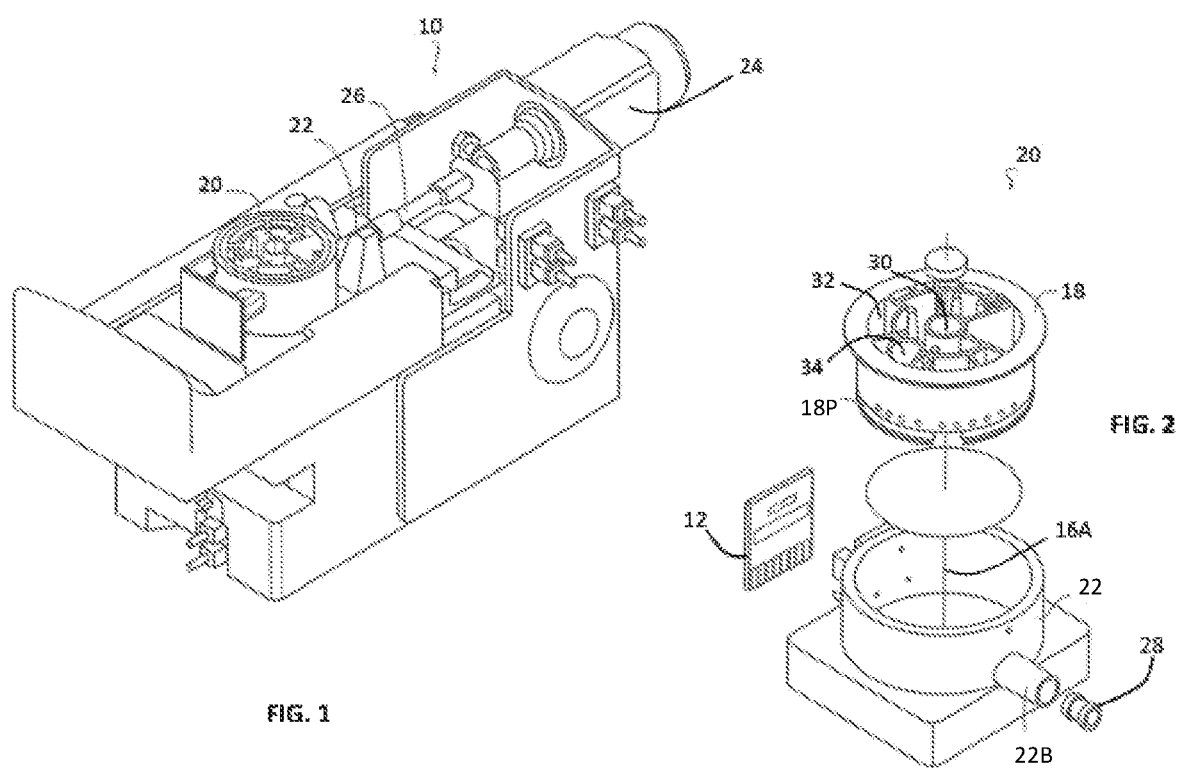

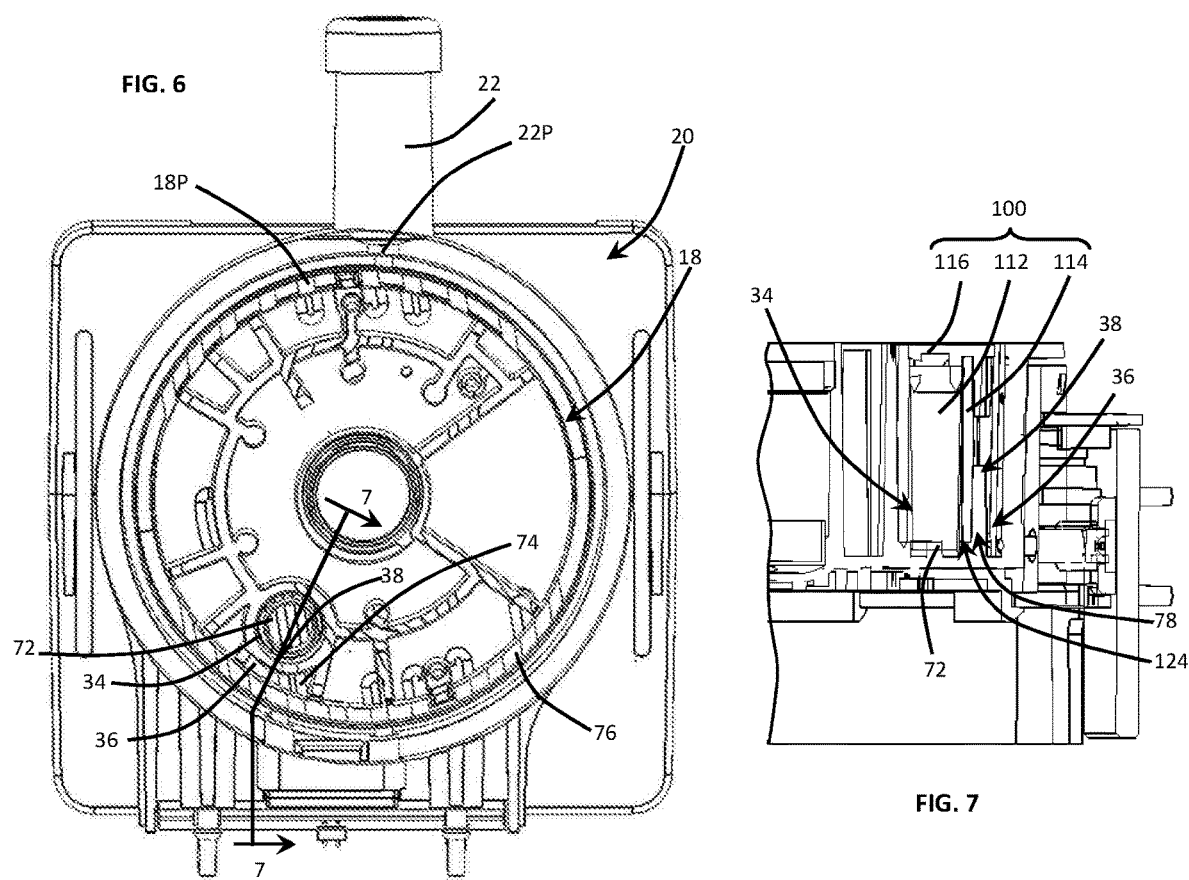

FILTRATION COLUMN ASSEMBLY FOR DIAGNOSTIC ASSAY SYSTEM

CROSS-REFERENCE TO RELATED APPLICATIONS

This application is a Non-Provisional Utility Patent application which claims priority from a first U.S. Provisional Patent Application Ser. No. 62/337,423 filed May 17, 2016 entitled "Modified Desalting Column" and a second U.S. Provisional Patent Application Ser. No. 62/337,446 filed May 17, 2016 entitled "Multi-Chamber Rotating Valve and Cartridge" The contents of the aforementioned applications are hereby incorporated by reference in their entirety.

This application also relates to U.S. patent application Ser. No. 15/157,584 filed May 18, 2016 entitled "Method and System for Sample Preparation" which is a continuation of U.S. Non-Provisional patent application Ser. No. 14/056,603, filed Oct. 17, 2013, now U.S. Pat. No. 9,347,086, which claims priority to U.S. Provisional Patent Application Ser. No. 61/715,003, filed Oct. 17, 2012, which is a continuation-in-part of U.S. patent application Ser. No. 12/785,864, filed May 24, 2010, now U.S. Pat. No. 8,663,918, which claims priority to U.S. Provisional Patent Application Ser. No. 61/180,494, filed May 22, 2009, and which is also a continuation-in-part of U.S. patent application Ser. No. 12/754,205, filed Apr. 5, 2010, now U.S. Pat. No. 8,716,006, which claims priority to U.S. Provisional Patent Application Ser. No. 61/166,519, filed Apr. 3, 2009. The contents of the aforementioned applications are hereby incorporated by reference in their entirety.

TECHNICAL FIELD

This invention relates to a disposable cartridge for use in combination with a diagnostic assay system which performs RNA polymerase-DNA analysis of a biological sample. The assay system drives a rotor about a rotational axis as a syringe plunger injects and withdraws sample fluids into and out of the disposable cartridge. Embodiments of a disposable cartridge are disclosed including variations which facilitate flow, repeatability, reliability, admixture, and preparation of the assay fluids.

BACKGROUND

There is continuing interest to improve testing methodologies, facilitate collection and decrease the time associated with clinical laboratories. Particular testing requires that a sample be disrupted to extract nucleic acid molecules such as DNA or RNA.

The number of diagnostic tests performed annually has increased exponentially in the past decade. The use of molecular diagnostics and gene sequencing in research and medical diagnostics is also rapidly growing. For example, DNA testing has also exploded in view of the growing interest in establishing and tracking the medical history and/or ancestry of a family. Many, if not all of these assays, could benefit from a rapid sample preparation process that is easy to use, requires no operator intervention, is cost effective and is sensitive to a small sample size.

Sample collection and preparation is a major cost component of conducting real-time Polymerase Chain Reaction (PCR), gene sequencing and hybridization testing. In addition to cost, delays can lead to the spread of infectious diseases, where time is a critical component to its containment/abatement. In addition to delaying the test results, such activities divert much-needed skilled resources from the laboratory to the lower-skilled activities associated with proper collection, storage and delivery.

For example, a portable molecular diagnostic system could be operated by minimally trained personnel (such as described in US 2014/0099646 A1) and have value with regard to disease surveillance. However, the adoption of such portable systems can be limited/constrained by current methods of sample collection, which require trained personnel to permit safe and effective handling of blood/food/biological samples for analysis. Other limitations relate to: (i) the ability of injected/withdrawn fluids to properly flow, (ii) manufacturability, (iii) cross-contamination of assay fluids which may influence the veracity of test results, (iv) proper admixture of assay fluids to produce reliable test results, and (v) the ability or inability to introduce catalysts to speed the time of reaction, A need, therefore, exists for an improved disposable cartridge for use in combination with a portable molecular diagnostic/assay system which facilitates/enables the use of minimally-trained personnel, hands-off operation (once initiated), repeatable/reliable test results across multiple assay samples (e.g., blood, food, other biological samples) and an ability to cost effectively manufacture the disposable cartridge for the diagnostic assay system.

SUMMARY

The present disclosure relates to a variety of disposable cartridge configurations for a portable molecular diagnostic/assay system.

In one embodiment, a filtration column assembly is provided for use in combination with a disposable cartridge of a diagnostic assay system. The filtration column assembly includes a column matrix material configured to filter a fluid sample, a tubular column configured to sealably engage a filtration chamber of the disposable cartridge and a cap configured to be inserted into an end of the tubular column and define a passageway to direct the sample fluid from the second end of the tubular column into a collection cavity disposed adjacent the filtration chamber. The tubular column defines: (i) a column cavity for receiving the column matrix material, (ii) a first end having an opening for receiving the fluid sample and configured to retain the column matrix material, and (iii) a second end, receiving the fluid directing cap, and having an opening to dispense a filtered fluid sample from the column cavity.

In another embodiment, a disposable cartridge is provided for mitigating cross-contamination of fluid sample reagents. This embodiment includes a cartridge body defining a syringe barrel having an barrel port operative to inject and withdraw assay fluids in response to the displacement of a syringe plunger. Furthermore, the disposable cartridge includes a rotor defining a plurality of assay chambers disposed in fluid communication with the barrel port through one of a plurality of rotor ports disposed about the periphery of the rotor. Finally, the disposable cartridge includes a flow control system between the barrel and rotor ports which prevents cross-contamination of fluid sample reagents from one assay chamber to another assay chamber.

BRIEF DESCRIPTION OF THE DRAWINGS

The present invention is disclosed with reference to the accompanying drawings, wherein:

FIG. 1 is a perspective view of a portable diagnostic assay system operative to accept one of a plurality of disposable cartridges configured to test fluid samples of collected blood/food/biological samples.

FIG. 2 is an exploded perspective view of one of the disposable cartridges configured to test a blood/food/biological sample.

FIG. 6 is a cross-sectional view taken substantially along line 6-6 of FIG. 5 wherein a plurality of ports are depicted in a common plane of the cartridge rotor.

FIG. 7 is a cross-sectional view taken substantially along line 7-7 of FIG. 6 depicting the filtration column disposed in a filtration chamber of the disposable assay cartridge.

FIGS. 25a-25d are sectional views of the disposable cartridge illustrating various alternative embodiments for preventing cross-contamination from one disposable cartridge to another when using a common diagnostic assay test device wherein FIG. 25a depicts a disposable shaft, FIG. 25b depicts a series of compliant washers disposed within the syringe barrel to limit exposure of a permanent shaft of the diagnostic assay device to the assay fluids, FIG. 25c shows a bellows diaphragm to fully contain the fluids within the syringe barrel, and FIG. 25d illustrates a primary working plunger disposed in combination with a secondary plunger for preventing the permanent shaft from exposure to the contaminating assay fluids.

Corresponding reference characters indicate corresponding parts throughout the several views. The examples set out herein illustrate several embodiments of the invention but should not be construed as limiting the scope of the invention in any manner.

DETAILED DESCRIPTION

Figure 3:
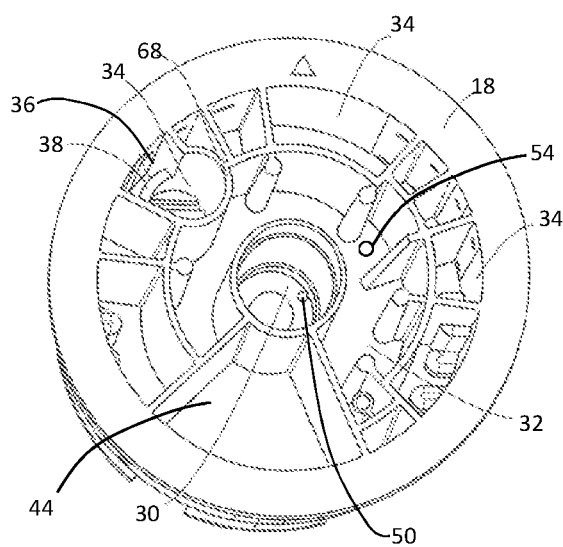
FIG. 3 is a top view of the one of the disposable cartridges illustrating a variety of assay chambers including a central assay chamber, one of which contains an assay chemical suitable to breakdown the fluid sample to detect a particular attribute of the tested fluid sample.

A disposable cartridge is described for use in a portable/automated assay system such as that described in commonly-owned, co-pending U.S. patent application Ser. No. 15/157,584 filed May 18, 2016 entitled "Method and System for Sample Preparation" which is hereby included by reference in its entirety. While the principal utility for the disposable cartridge includes DNA testing, the disposable cartridge may be used in be used to detect any of a variety of diseases which may be found in either a blood, food or biological specimen. For example, blood diagnostic cartridges may be dedicated cartridges useful for detecting hepatitis, autoimmune deficiency syndrome (AIDS/HIV), diabetes, leukemia, graves, lupus, multiple myeloma, etc., just naming a small fraction of the various blood borne diseases that the portable/automated assay system may be configured to detect. Food diagnostic cartridges may be used to detect *Salmonella, E-coli, Staphylococcus aureus* or dysentery. Diagnostic cartridges may also be used to test samples from insects and animals to detect diseases such as malaria, encephalitis and the west nile virus, to name but a few.

More specifically, and referring to FIGS. 1 and 2, a portable assay system 10 receives any one of a variety of disposable assay cartridges 20, each selectively configured for detecting a particular attribute of a fluid sample, each attribute potentially providing a marker for a blood, food or biological (animal borne) disease. The portable assay system 10 includes one or more linear and rotary actuators operative to move fluids into, and out of, various compartments or chambers of the disposable assay cartridge 20 for the purpose of identifying or detecting a fluid attribute. More specifically, a signal processor 14, i.e., a PC board, controls a rotary actuator (not shown) of the portable assay system 10 so as to align one of a variety of ports 18P, disposed about a cylindrical rotor 18, with a syringe barrel 22B of a stationary cartridge body 22. The processor 14 controls a linear actuator 24, to displace a plunger shaft 26 so as to develop pressure i.e., positive or negative (vacuum) in the syringe barrel 22. That is, the plunger shaft 26 displaces an elastomer plunger 28 within the syringe 22 to move and or admix fluids contained in one or more of the chambers 30, 32.

The disposable cartridge 20 provides an automated process for preparing the fluid sample for analysis and/or performing the fluid sample analysis. The sample preparation process allows for disruption of cells, sizing of DNA and RNA, and concentration/clean-up of the material for analysis. More specifically, the sample preparation process of the instant disclosure prepares fragments of DNA and RNA in a size range of between about 100 and 10,000 base pairs. The chambers can be used to deliver the reagents necessary for end-repair and kinase treatment. Enzymes may be stored dry and rehydrated in the disposable cartridge 20, or added to the disposable cartridge 20, just prior to use. The implementation of a rotary actuator allows for a single plunger 26, 28 to draw and dispense fluid samples without the need for a complex system of valves to open and close at various times. This greatly reduces potential for leaks and failure of the device compared to conventional systems. Finally, it will also be appreciated that the system greatly diminishes the potential for human error.

Figure 4:
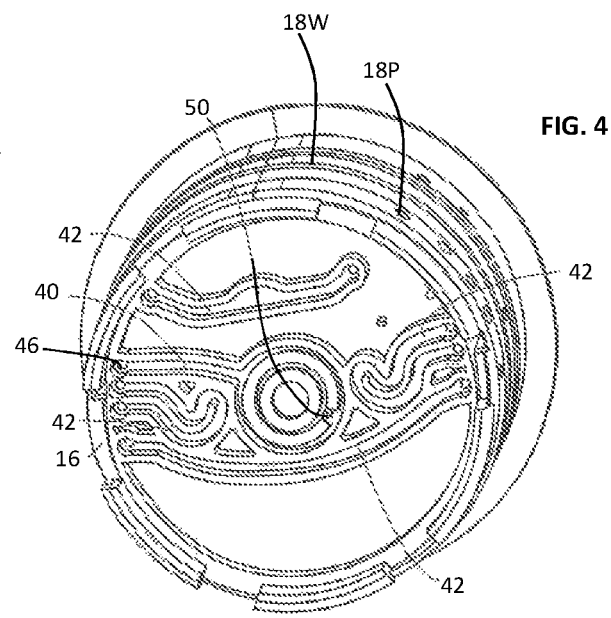
FIG. 4 is a bottom view of the disposable cartridge shown in FIG. 3 illustrating a variety of channels operative to move at least a portion of the fluid sample from one chamber to another the purpose of performing multiple operations on the fluid sample.

In FIGS. 3 and 4, the cylindrical rotor 18 includes a central chamber 30 and a plurality of assay chambers 32, 34 surrounded, and separated by, one or more radial or circumferential walls. In the described embodiment, the central chamber 30 receives the fluid sample while the surrounding chambers 32, 34 contain a premeasured assay chemical or reagent for the purpose of detecting an attribute of the fluid sample. The chemical or reagents may be initially dry and rehydrated immediately prior to conducting a test. Some of the chambers 32, 34 may be open to allow the introduction of an assay chemical while an assay procedure is underway or in-process. The chambers 30, 32, 34 are disposed in fluid communication, i.e., from one of the ports 18P to one of the chambers 30, 32, 34, by channels 40, 42 molded along a bottom panel 44, i.e., along underside surface of the rotor 18. For example, a first port 18P, corresponding to aperture 42, may be in fluid communication with the central chamber 30, via aperture 50.

Filtration Cartridge

During development of the disposable cartridge, and as the inventors acquired an appreciation for, and understanding of, the fluid dynamics involved with respect to injecting, dispensing and withdrawing the assay fluids, they discovered that surface tension between components can significantly impact fluid flow from one chamber 32 to another chamber 34. As a consequence, they learned that the properties of surface tension can detrimental or advantageous to fluid flow. For example, surface tension between a film cover 60 (see FIG. 5), which encloses or encapsulates the assay fluids of the various chambers 30, 32, 34, 36, and an upper end of a filtration column assembly 100, can prevent the flow of assay fluids from the filtration chamber 34 to an adjacent collection chamber 36. The following discloses embodiments of a filtration column assembly 100 which facilitates fluid flow from the filtration chamber 34 to the collection chamber 36.

Figure 5:
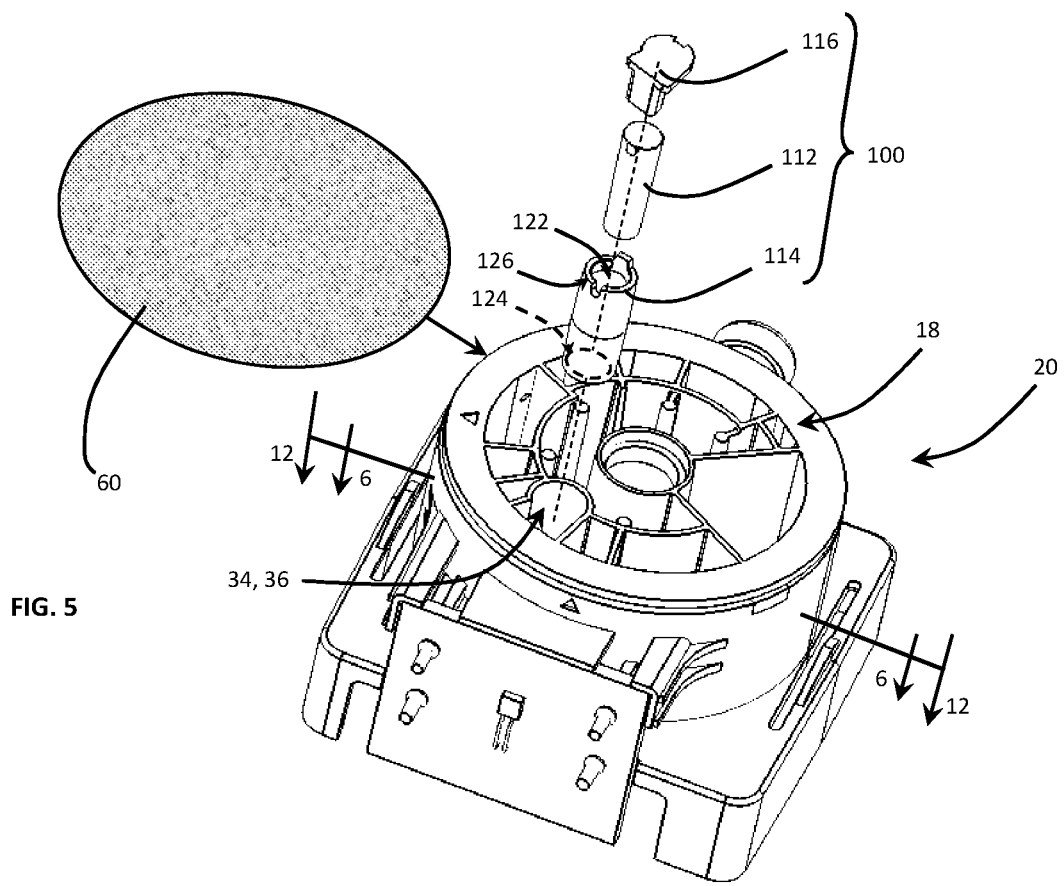
FIG. 5 is an exploded perspective view of the disposable cartridge including a filtration column assembly comprising a column matrix material, a tubular column receiving and retaining the column matrix material, and a fluid directing cap configured to restrict the volume of a filtered fluid sample while maintaining a pressurized flow path.
Figure 8:
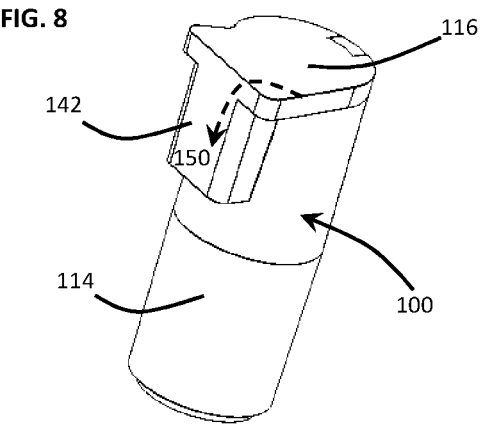
FIG. 8 is an isolated perspective view of the filtration column depicting a fluid guide operative to direct the filtered fluid sample into a collection chamber.

In FIG. 5, a novel filtration column assembly 100 comprises: (i) a column matrix material 112 configured to filter a fluid sample; (ii) a tubular column 114 having a column cavity for receiving/retaining the column matrix material and configured to sealably engage a filtration chamber 34 of the disposable cartridge 20, and (iii) a fluid directing cap 116, configured to be detachably mounted to one end of the column and defining a passageway (not viewable in FIG. 5) configured to direct a filtered fluid sample from the tubular column 114 into the collection chamber 36. In another embodiment of the novel filtration column assembly 100, the cap 116 is configured to restrict the volume of the filtered fluid sample collected above the column matrix material 112 while maintaining a pressurized flow path.

In FIG. 6, a cross-sectional view through the key-hole shaped filtration and collection chambers 34, 36 reveals a wall 38 separating the chambers 34, 38. FIG. 3 also depicts a separating wall 38 which is about one-half (½) the wall height of the filtration chamber 34. In the view shown, the filtration chamber 34 includes a plurality of raised surfaces or ridges 74 to facilitate flow of the fluid sample from a port 74 through the cylindrical wall 76 of the disposable cartridge 20, i.e., of the rotor 18. That is, assay fluid will be injected into the port 74 which will, in turn flow between the ridges 74, and into a bottom end of the tubular column 114, Inasmuch as the intervening wall 38, i.e., the wall separating the filtration and collection chambers 34, 36, is less than the full wall height of the filtration chamber 34, it will be appreciated that, when fluid in the tubular column 114 reaches this level or height, the sample fluid will accumulate in the filtration chamber 34 and flow over the wall 38 between the chambers 34, 36. To prevent flow from taking this path or direction, i.e., over the wall 38, without travelling through the length of the tubular column 114, the bottom portion 124 of the tubular column 114 is configured to sealably engage the surrounding filtration and collection chamber walls 68. This forces pressurized assay fluid to flow upward through the length of the tubular column 114.

Figure 9:
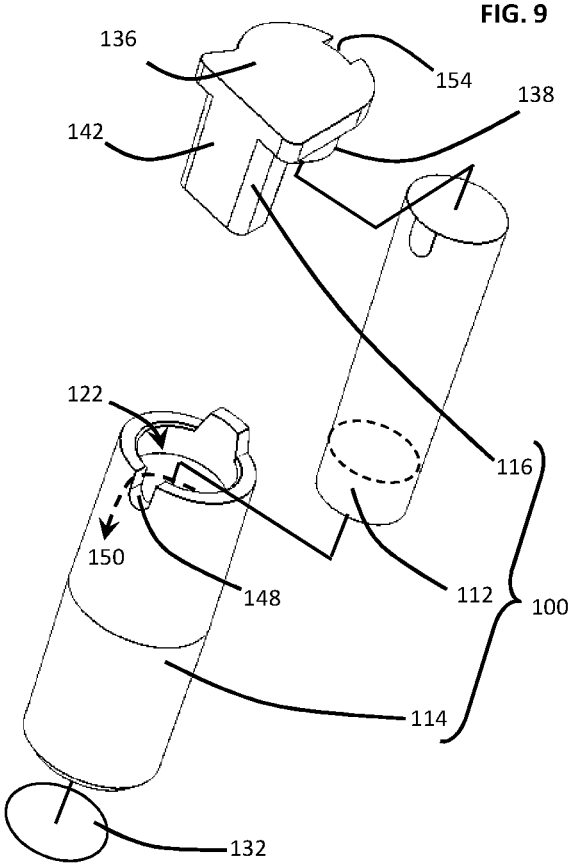
FIG. 9 is an exploded perspective view of the filtration column including the column matrix material, the tubular column for receiving the column matrix material, the fluid directing cap and a retention filter melted, welded, or otherwise attached to the lower end of the tubular column.

The column matrix material 112 is a filter material which is operative to secure, trap or chemically bond, a select material suspended or flowing with, a carrier fluid, i.e., water, lysis fluid, etc. In the illustrated embodiments, the column matrix material 112 has transitioned from a dehydrated condition, i.e., shown in phantom in FIG. 9, to a hydrated condition, i.e., shown in solid lines in FIGS. 5, 7, 9 and 11. Initially, the column matrix material 112 is significantly smaller than the column cavity 122 and is retained therein by a screening material disposed at each end of the tubular column 112. More specifically, a first filter material 132 is melted, welded or otherwise affixed to the first end of the tubular column 114 while a second filter material 134 is melted, welded or otherwise affixed to the removable cap 116 of the filtration column 100, i.e., when the cap 116 is inserted in the second end of the tubular column 114. As such, the first filter material 132 retains the column matrix material by closing-off the first opening 124 in the bottom end of the column 114 while the second filter material 134 retains the column matrix material 112 by closing-off the second end of opening 126 in the tubular column 114.

Upon contact with the fluid sample, the column matrix material 112 is hydrated to fill the width of the tubular column 114. Furthermore, the column matrix material 112 grows to a prescribed length necessary to remove the target molecular material from the fluid sample. As fluid passes through the column matrix material 112, it traps small molecule materials in the matrix while allowing large molecule materials to pass. In the described embodiment, the small molecule material is sodium chloride (i.e., salt), however, the fluid dynamics described herein are applicable to any filtration material requiring a particular length of matrix material to remove a select molecule. For example, the column matrix material 112 may remove materials from a group comprising, but not limited to: phosphates, sodium and polysaccharides. In the described embodiment, the large molecule material may be a deoxyribonucleic acid (DNA) molecule. It is this large molecule material which will ultimately be deposited in the collection chamber 36 and screened for testing.

It should be appreciated that the filter material 132, 134 may be any conventional screening material which allows molecules of a particular size to pass. In the described embodiment, the filter materials 132, 134 allow both large and small molecules to pass. Accordingly, the filter materials 132, 134 do not remove molecules from the fluid assay sample, but merely function as a convenient solution to retain the both the dehydrated and hydrated column matrix material in the tubular column 114. Furthermore, the filter materials 132, 134 allow the passage of molecules larger than those trapped by the column matrix material 114.

The cap 116 is configured to be inserted into the second or upper end 126 of the tubular column 112, functionally retains the other end of the column matrix material 114, and defines a passageway configured to direct a filtered fluid sample from the tubular column 114 into the collection chamber 36. Alternatively, or additionally, the cap 116 may be configured to restrict the volume of the filtered fluid sample collected above the column matrix material 112 and maintain a pressurized flow path.

Figure 10:
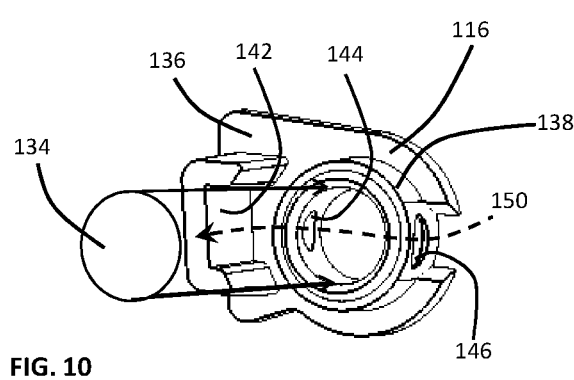
FIG. 10 is an exploded, isolated, perspective view of the fluid directing cap depicting the underside surface of the cap, including a retention filter disposed in combination with an annular rim of the fluid directing cap.

The cap 116 includes a substantially planar cover 136, an annular rim 138 projecting orthogonally from the plane of the cover 136, and a fluid guide 142 also projecting from the cover 136 and defining a fluid path or passageway 150 from the upper portion of the column matrix material 112 to the collection chamber 36. The annular rim 138 of the cap 116 is configured to be inserted into the upper end, i.e., into the upper opening 126, of the tubular column 114 and includes an effluent opening 146 (best seen in FIG. 10) aligned with a transverse opening 148 in the wall of the tubular column 114. More specifically, the fluid guide 142 of the cap 116 is configured to receive a filtered fluid sample from the aligned openings 146, 148 to direct the filtered fluid sample into the collection chamber 36 of the disposable cartridge 20.

Figure 11:
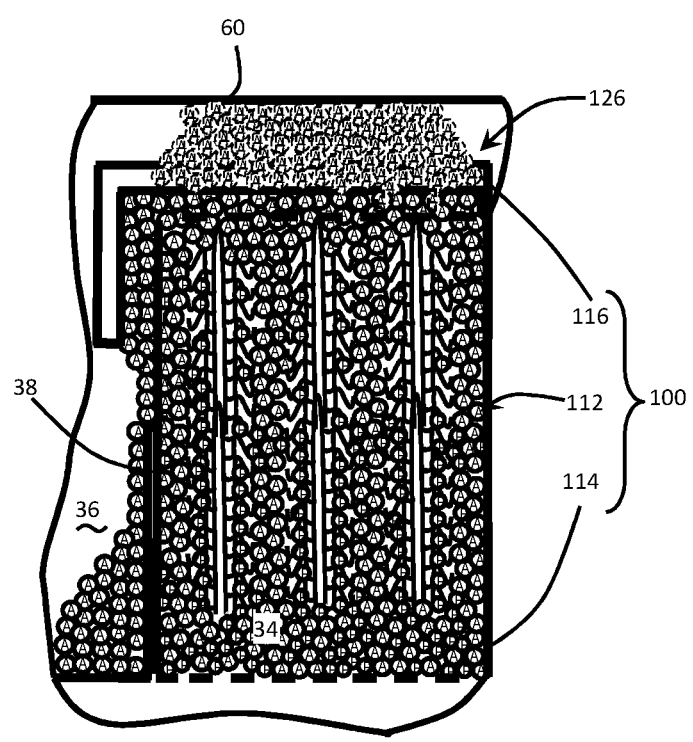
FIG. 11 is a schematic side sectional view of the filtration column including the column matrix material for trapping/filtering small molecule materials while allowing the passage of large molecules.

In FIG. 11, a schematic of the filtration column 100 is depicted with the cap 116 inserted in the upper end 126 of the tubular column 114. As eluded to supra, the cap 116 reduces the volume of filtered assay fluid which may collect on the top of the column matrix material 112. As such, the cap 116 retains sufficient head pressure, and creates a pressurized passageway 150 which avoids the difficulties associated with the surface tension between the upper end of the filtration column 100 and a film cover which encapsulates the various cavities and chambers 30, 32, 34, 36 of the disposable cartridge 20.

Flow Control System

While the previous section disclosed an embodiment relating to one chamber for filtration and another for collection of a filtered assay fluid, the following section relates to improvements pertaining to flow control between the syringe barrel 22B and the plurality of ports 16 disposed about the periphery of the rotor 18. During a period of development, understanding and discovery, the inventors learned that the manufacture of the disposable cartridge 20, and in particular, the manufacture of the syringe barrel 22B and the rotor 18, presented certain challenges that could only be addressed by a novel compliant over-mold 200 disposed between the rotor 18 and the stationary cartridge body 22. Before discussing the compliant over-mold 200, it will helpful to understand some other considerations pertaining to the need for the compliant over-mold 200.

Various methods for manufacturing the rotor and cartridge body 22 were considered in the early stages of the cartridge development. It will be appreciated that for the cartridge to be disposable, (i.e., used only once), it must be extremely inexpensive to fabricate, i.e., to satisfy the margins necessary for profitability. On the other hand, both the rotor and cartridge body are intricate, i.e., requiring a multiplicity of very narrow apertures 18P and channels 40, 42 (shown in FIGS. 3 and 4). One manufacturing approach considered by the inventors involved a combination of molding and machining steps. For example, the rotor 18 and cartridge body 22 may be independently molded, and subsequently machined to produce the many intricate rotor and syringes ports 18P, 22P. Furthermore, this approach facilitates the fabrication of the requisite narrow ports 18P, 22P, which enables surface tension developed in the ports 18P, 22P to prevent backflow contamination of the assay fluids. While this approach provides the desired port dimensions, the subsequent machining operation is far too costly for a diagnostic system which employs disposable cartridges 20.

Another approach involved injection molding which significantly reduces manufacturing costs, however, this method also has certain limitations relating to the dimension/diameter of the rotor and syringe ports 18P, 22P. More specifically, the molding pins used to fabricate the ports 18P, 22P must maintain a certain threshold dimension to prevent the molding pins from failing or fracturing during the injection molding process. As such, the requisite pin size for fabricating the ports 18P, 22P is significantly larger than the optimum port dimension for preventing backflow contamination. As such, the port size which must be maintained cannot take advantage of the properties of surface tension to prevent backflow contamination. Consequently, a need arose for a fabrication method which employs injection molding as the principle fabrication technique (to keep costs to a minimum) while producing the requisite port size without resorting to more expensive manufacturing methods.

Figure 12:
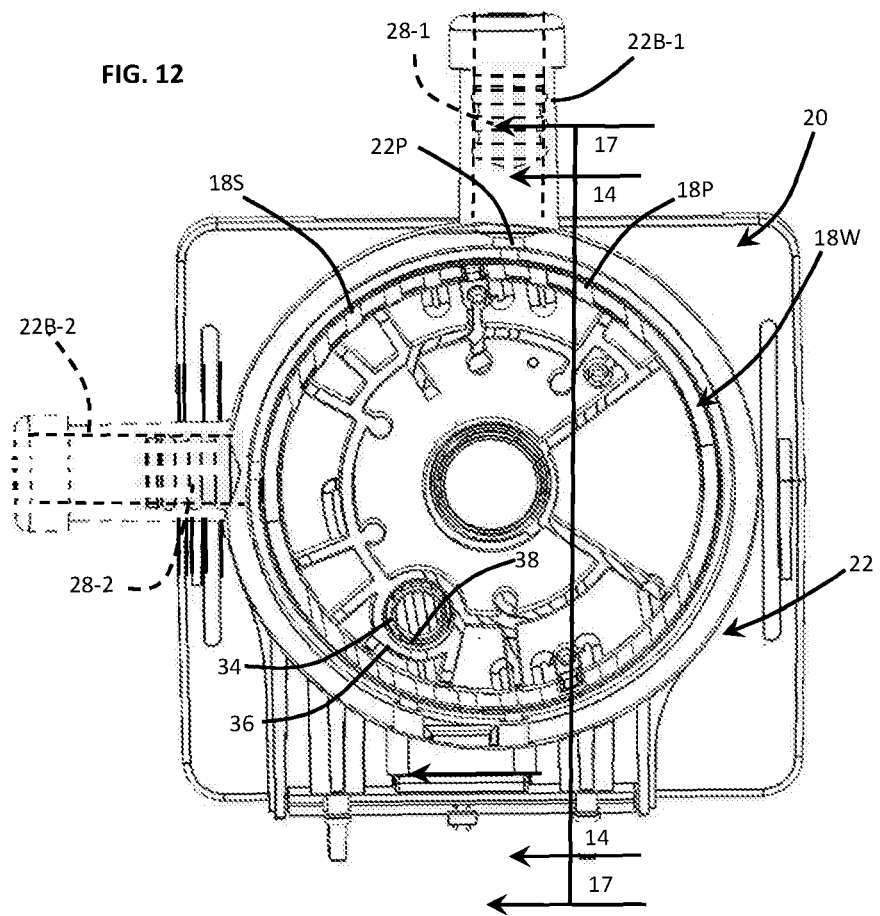
FIG. 12 is a cross-sectional view taken substantially along line 12-12 of FIG. 5 wherein a plurality of rotor ports are depicted in a common plane along with the syringe barrel and a barrel port of the cartridge body.
Figure 13:
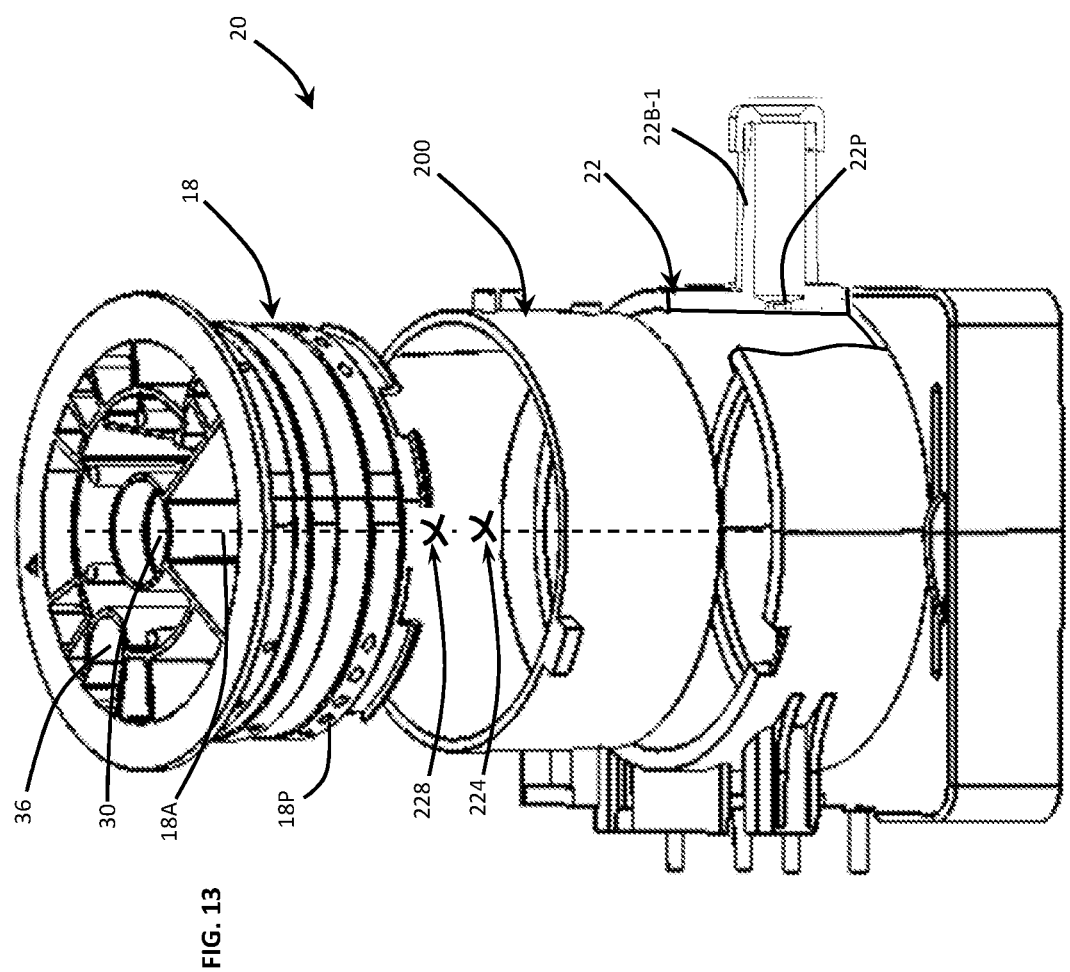
FIG. 13 depicts an exploded perspective view of the disposable cartridge assembly including a compliant over-mold disposed between the rotor and the cartridge body.

In FIGS. 12 and 13, disposable cartridge 20 comprises a rotor 18, cartridge body 22, and a flow control system 200 operative to prevent cross-contamination of fluid sample reagents from one assay chamber to another assay chamber. As described supra, the rotor 18 comprises a plurality of assay chambers 30, 34 rotatable about an axis 18A and rotationally mounted to the cartridge body 22. Furthermore, the rotor 18 defines a peripheral surface, i.e., a cylindrical surface 18S, having a plurality of ports 18P disposed about the surface 18S and extending through the wall 18W which defines the peripheral surface 18S. The cartridge body 22, on the other hand, comprises a syringe barrel 22B operative to inject and withdraw assay fluids in response to axial displacement of a syringe plunger 28 disposed within the syringe barrel 22B. Both the rotor 18 and cartridge body 22 includes ports 18P and 22P, respectively, which are fabricated using a conventional injection molding process. Accordingly, the port size is limited by the pin restraints of an injection molding process.

To combat the difficulties associated with cross-contamination of fluid sample reagents, a moldable, compliant valve, or elastomer over-mold 200, was interposed between the rotor 18 and cartridge body 22. In FIGS. 12-16, the elastomer or compliant over-mold 200 defines at least one compliant opening 204 having a maximum opening dimension which is smaller than the dimension of the rotor ports 18P. Furthermore, the compliant openings 204 has a maximum opening dimension which is smaller than the dimension of the barrel port 22P. In the described embodiment the average opening dimension of the barrel port 22P is about 2.5 mm whereas the opening dimension of the compliant opening is less than about 1.5 mm and preferably less than about 1.0 mm. Operationally, the compliant opening 204 is configured to: (i) enlarge when fluid pressure is applied in response to axial movement of the plunger 28 during injection and (ii) diminish in size when fluid pressure is reduced.

Figure 14:
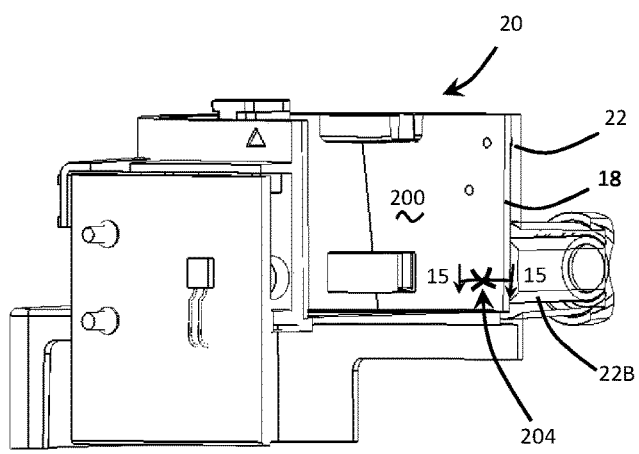
FIG. 14 is a cross-sectional view of the disposable cartridge taken substantially along line 14-14 of FIG. 12 depicting an internal view of the compliant over-mold to show the location of several compliant openings in the over-mold.
Figure 15:
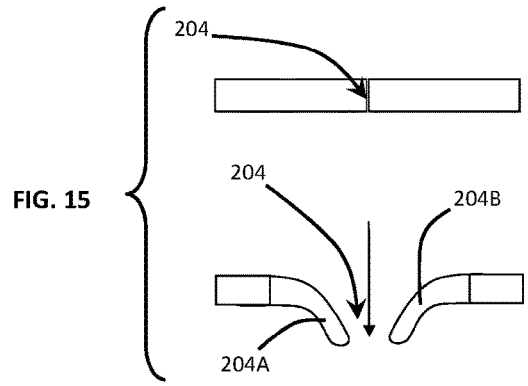
FIG. 15 is a cross-sectional view of the disposable cartridge taken substantially along line 15-15 of FIG. 14 depicting an X-shaped valve disposed in a compliant over-mold for preventing backflow contamination from one assay chamber to another.
Figure 16:
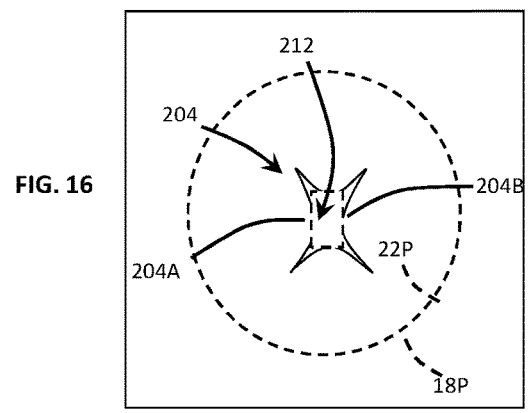
FIG. 16 is an enlarged plan view of the X-shaped valve depicting the size differential between the opening of the X-shaped valve and the diameter of the barrel port of the cartridge body.

In one embodiment, depicted in FIGS. 14-16, the compliant opening 204 includes intersecting cuts 212 configured to cross the opening of the barrel port 22P. In this embodiment, the X-shaped opening has flexible corner segments 204A, 204B which may flap or bend so as to produce a larger opening, i.e., to permit a larger flow of assay fluid through the compliant opening 204. Consequently, the corner segments 204A, 204B of the compliant opening 204 function as a valve, i.e., opening to permit a greater flow rate in response to positive pressurization and closing in the absence of the positive pressurization. It will also be appreciated that the segments 204A, 204B may flex in the opposite direction to allow fluid to be withdrawn from an assay chamber 30, 32, 34. Accordingly, the compliant X-shaped opening can also function as a two-way valve, i.e., opening in one direction to allow flow in that direction and in another direction to allow flow in the opposite direction. To further increase the flow rate across the intersecting cuts 204, a portion of the cross-over region, i.e., the portion closest or proximal to the cross-over cuts can be removed or eliminated to facilitate flow. In the described embodiment, the portion of the cross-over region 212 which is removed is less than about 10 mm and in another embodiment the region 212 is less than about 5 mm.

Figure 17:
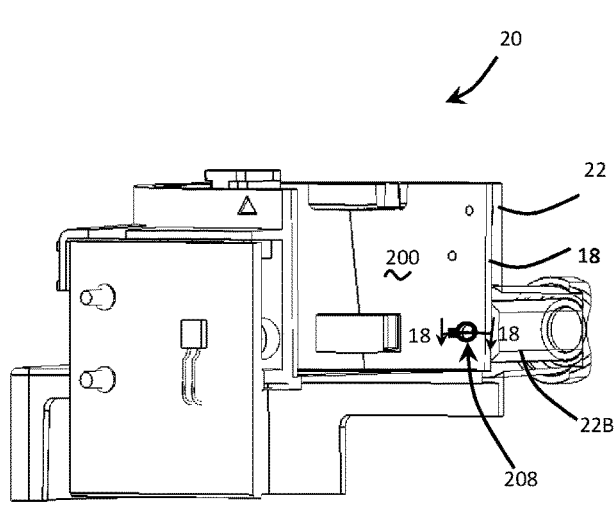
FIG. 17 is a cross-sectional view of the disposable cartridge taken substantially along line 17-17 of FIG. 12 depicting an internal view of the compliant over-mold to show the location of several compliant openings in the over-mold.
Figure 18:
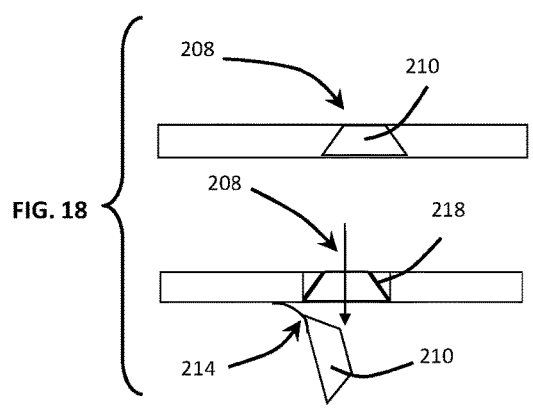
FIG. 18 is a cross-sectional view of the disposable cartridge taken substantially along line 18-18 of FIG. 17 depicting a flap valve disposed in the compliant over-mold for preventing backflow contamination from one assay chamber to another assay chamber.
Figure 19:
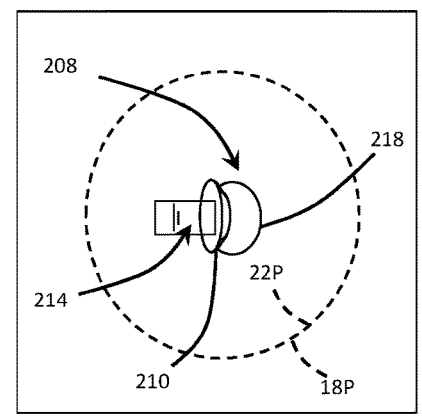
FIG. 19 is an enlarged plan view of the flap valve depicting the size differential between the opening of the flap valve and the diameter of the barrel port of the cartridge body.

In another embodiment, depicted in FIGS. 17-19, the compliant opening 208 may comprise a flap 210 mounted to an edge of the opening 208 by a flexible elastomer hinge 214. In this embodiment, the compliant opening 208 includes a frustum-shaped opening 218 while the flap 210 includes an edge which is complimentary-shaped to seat in the frustum-shaped opening 218. Similar to the previous embodiment, the compliant opening 208 has a maximum opening dimension which is smaller than the dimension of the rotor ports 18P. Furthermore, the compliant opening 208 has a maximum opening dimension which is smaller than the dimension of the barrel port 22P. Both the rotor and barrel ports 18P, 22P are shown in dashed or phantom lines in FIGS. 17-19.

Operationally, the flap 210 of the compliant opening 208 is unseated as the pressure within the syringe barrel increases to inject assay fluid into the rotor 16 through one of the ports 18P. The increased pressure causes the flap 210 to pivot about the hinge axis to dispense the assay fluid into an assay chamber 32, 34, 36. Once this step is completed, the pressure is withdrawn such that the flap 210 closes and is reseated into the frustum-shaped opening. Next, the signal processor provides a signal to rotate the rotor to a new rotational position. The flap 210 of the compliant opening functions to prevent backflow of the recently deposited assay fluid into the syringe barrel 22B. As such, the X-shaped compliant opening 204, and the hinged flap 208 contained in the elastomer over-mold 200, prevent assay fluids from being wicked or drawn (should the syringe barrel 22 retain a small negative pressure or pocket of positive pressure) into the barrel port 22P. Accordingly, the over-mold valves 204, 208 ensure that the test results will not be tainted and will be accurate.

In yet another embodiment shown in FIGS. 12 and 13, the ports of the flow control system may be disposed on different geometric planes. Alternatively or additionally, ports having compatible reagents may be in fluid communication with one syringe barrel/plunger while ports having incompatible reagents may be in fluid communication with a different syringe barrel/plunder so as to separate/isolate incompatible reagents from each other. For example, reagents of one type may be injected by one of the syringe barrels/plungers 22B-1, 28-1 while reagents of another type may be injected by another one of the syringe barrels/plungers 22B, 28-2. In FIG. 13, a backside surface of the elastomer over-mold 200 is shown depicting two compliant openings 224, 228. One of the X-shaped compliant openings 224 is disposed proximal the bottom surface or plane of the rotor 18 and is fed by a first syringe barrel 22B-1 deployed on one plane of the disposable cartridge 20. A second X-shaped compliant opening 228 is fed by a second syringe barrel 22B-1 deployed on a second plane of the disposable cartridge 20. In the described embodiment, the port 224 disposed in one plane is separated or spaced apart from the port 228 disposed in another plane by a threshold or prescribed vertical distance.

In another embodiment of the disclosure, at least one of the rotor ports 18P includes a high viscosity gel disposed in the bore of the respective port 18P. The high viscosity is injected into at least one of the rotor ports 18P such that the gel extends the full length of the port, i.e., on average about 1.5 mm.

Operationally the gel is displaced under pressure to facilitate the transfer of fluid sample reagents from one assay chamber to another. In the described embodiment, at least one of the rotor ports 18P define a fluid volume which is less than about 15 microliters to mitigate backflow of a fluid sample reagent.

Co-Molded or Dual Material Rotor for Enhanced Thermal and Conformal Properties

In another embodiment of the disclosure, the rotor 18 comprises different materials to enhance the thermal and conformal properties of the disposable cartridge 20 Depending upon material compatibility, the rotor 18 may be molded in segments and subsequently joined/welded to form a complete rotor 18. By fabricating the rotor 18 employing at least two different materials, e.g., one segment having conductive properties and another segment fabricated from a high modulus material (having high strain properties), the rotor 18 can provide enhanced performance. For example, a lower portion of the rotor 18 can be fabricated using conductive materials to function as a heat sink. As such, a heating element (not shown in the drawing) can deliver heat to various chambers 32, 34, 36 and channels 40, 42 to accelerate reagent reactions and improve the performance of the disposable cartridge 20.

The rotor segments can be fabricated using a thermally conductive plastic or a thermally conductive elastomer. Both materials have superior thermal properties to standard polypropylene while the addition of elastomer has added conformal properties. Lastly, inasmuch as the upper segment of the rotor may comprise a material having low thermal conductivity, this segment will have insulating properties to retain heat in regions where it provides the most benefit.

Enhanced Mixing

Figure 20:
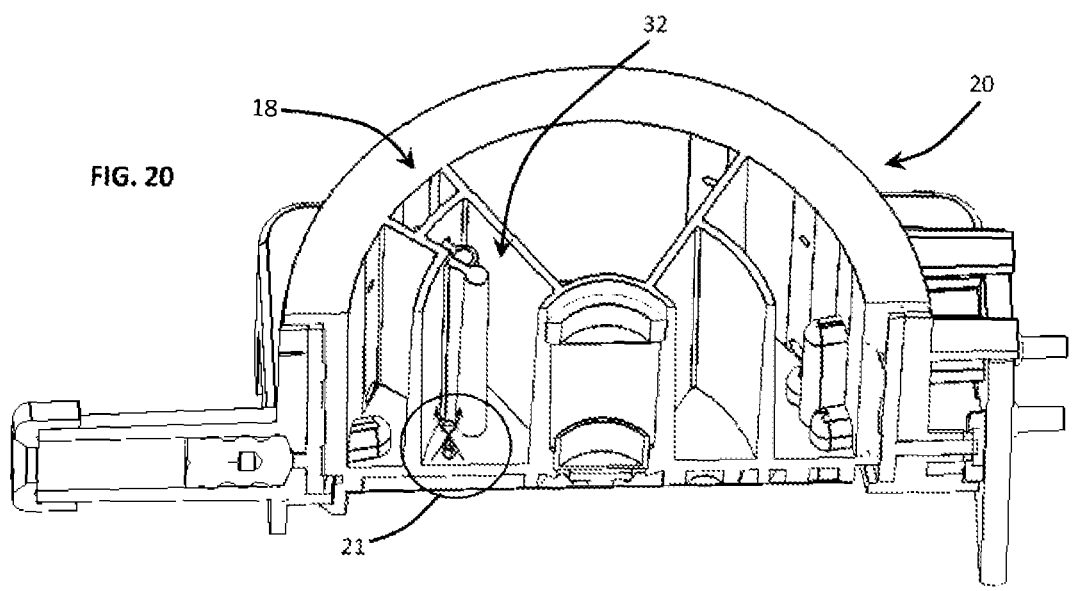
FIG. 20 is a sectional view through the disposable cartridge depicting a vortex generator disposed downstream of a rotor port to facilitate mixture of the assay fluids within the respective chamber of the rotor.
Figure 21:
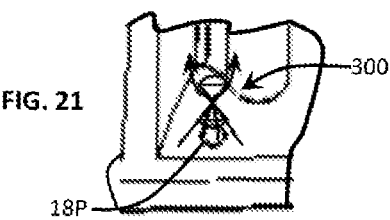
FIG. 21 is an enlarged, broken-away side view of the vortex generator shown in FIG. 20.

One of the requirements of the disposable cartridge 20 is the admixture of reagent fluids in the various chambers 30, 32, 34, 36 to ensure a complete, thorough and reliable result. While the diagnostic assay system 10 may include shakers, mixers and vibration inducing actuators, one of the easiest structures to accomplish mixing in a chamber includes a spinner, vortex generator or flow disruptor. FIGS. 20 and 21 depict another embodiment of the disposable cartridge wherein a vortex generator 300 is disposed above a port 18P extending through the bottom panel of the rotor 18. As assay fluid is injected into the port 18P, the fluid immediately encounters a disruptor in the fluid flow. The vortex generator 300 generates mixing vortices causing the injected fluid to mix with a fluid, e.g., a lysis buffer, in the chamber 32 of the rotor 18.

Sumps, Tapered Floors and Rounded Corners

Figure 22:
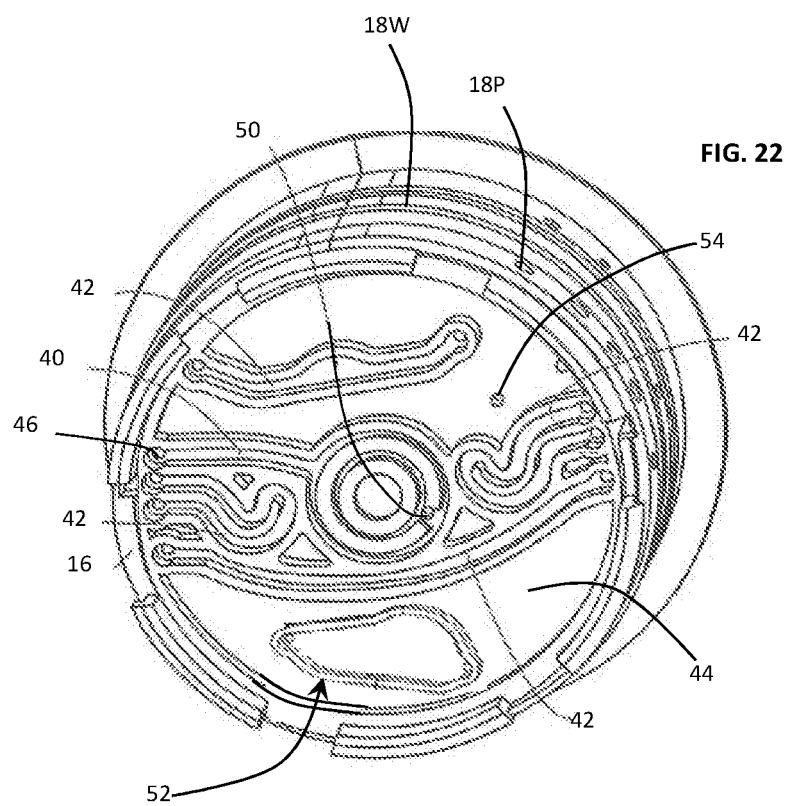
FIG. 22 is an bottom view of the rotor depicting an enlarged channel which may be heated to accelerate reagent reactions within the channel.

In another embodiment and referring to FIG. 22, the configuration of the rotor 18 and its chambers 30, 32, 34 and 36 may be configured to better extract all the contents from a reservoir. As such, sump areas may be created, corners of the walls may be rounded and the bottom panel 44 may be pitched or inclined in a direction toward a port 54 projecting upwardly through the bottom panel 44 of the rotor 18.

Heated Channels

In another embodiment and referring to FIG. 22, a large channel region 52 may be located on the bottom 44 of the rotor 18 and configured to be sufficiently large to retain and entire sample and lysing buffer mixture. As such, the high volume channel 52 may be positioned over a heating element (not shown) and integrated with a film disposed over the bottom channels 40, 42, and 52, to accelerate the reagent reactions occurring in the mixture.

Isolated Multi-Zoned Multiplexed PCR Using a Single Buffer

Figure 23:
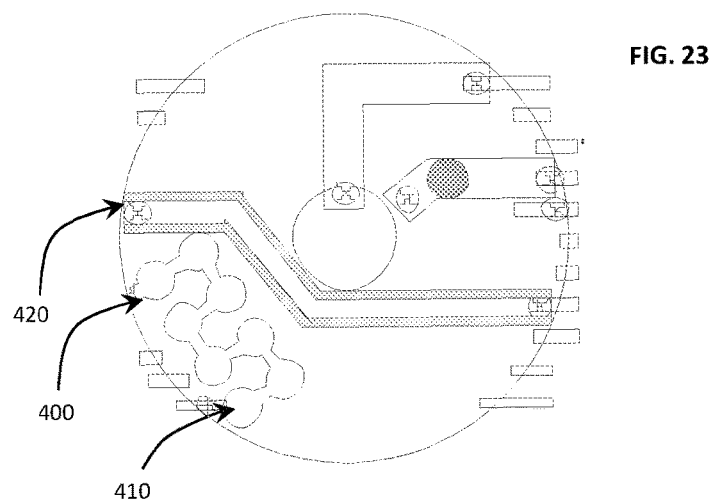
FIG. 23 depicts a bottom view of the rotor depicting segmented channels for performing various PCR reactions therein.

In yet another embodiment and referring to FIG. 23, one or more channels 40, 42 will be constructed in a segmented design in which PCR primers may be dispensed, dried and stored in individual segments 400. A subsequent coating may be applied to further encapsulate the dried primers 410. The coating serves two functions: (1) to preserve and protect the primers and (2) to prevent premature rehydration of the primers when the channel 420 is filled with a buffer material. Concerns relating to lateral diffusion may be minimized by the low primer diffusion rate, spot to spot distance (e.g., 3 to 5 mm.) and the use of narrow channels separating the spotted regions (choke point).

Figure 24:
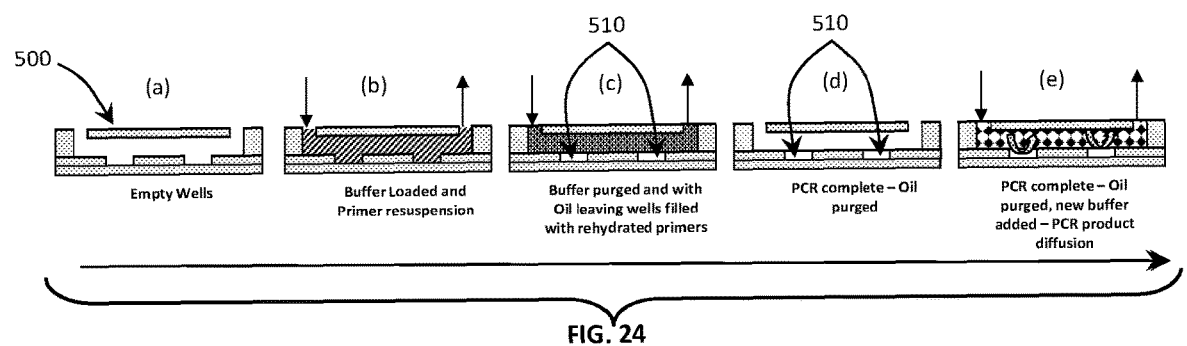
FIG. 24 depicts a series of primer interactions including the steps of: (i) resuspension of the primer by a buffer, (ii) purging the buffer, (iii) sealing the rehydrated primers in the respective suspension wells, and (iv) PCR product diffusion.
Figure 25A:
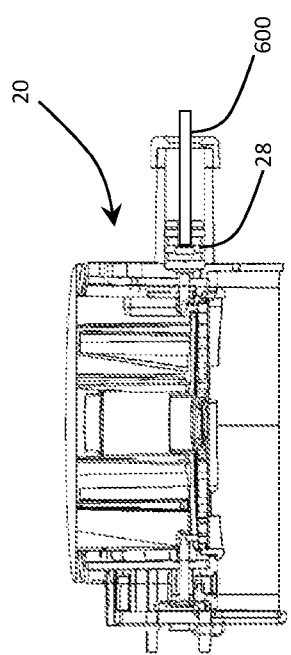
Figure 25B:
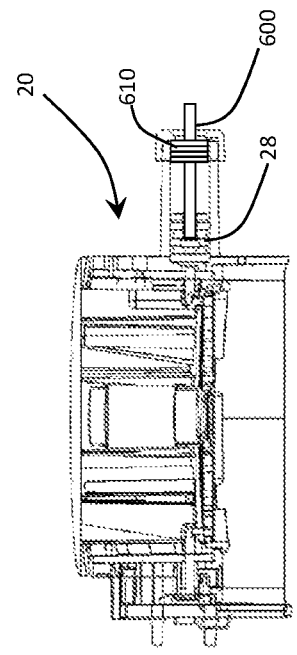
Figure 25C:
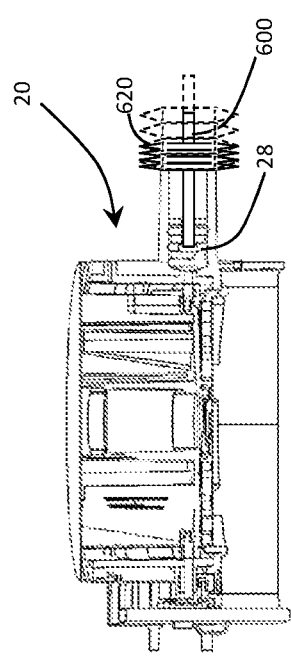
Figure 25D:
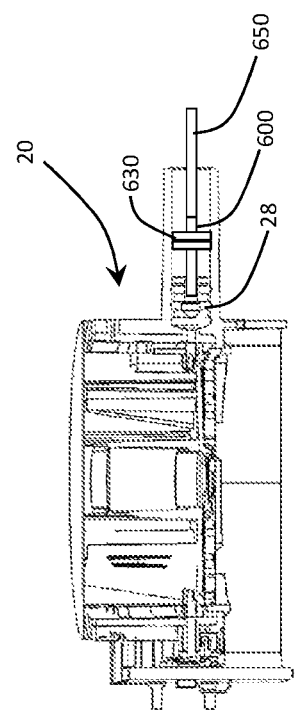

In another embodiment depicted in FIG. 24, isolation of the PCR regions can be achieved by utilizing small wells 500 created in a bottom film using a laminated film processing technique. The micro wells 500 would contain the dried primers 510 and other desired components. Upon filling the micro wells 500, i.e., performed in step (a) with a common buffer, the micro wells 500 may be filled in a step (b) to re-suspend the primers 510. A secondary, non-miscible fluid such as mineral oil may be added in a step (c) to cap the micro wells 500. With the micro wells sealed, in step (d), with the mineral oil, the PCR process can be performed. Extraction of the fluid in step (e) would first involve replacing the mineral oil with a suitable aqueous buffer. Due the large concentration gradient, a large quantity of the PCR product would then diffuse into the buffer.

To prevent the primer 510 from spreading during the loading phase, an encapsulant may be used. The encapsulant may be water soluble, semi-water soluble or temperature sensitive in order to prevent immediate rehydration of the primers. Upon filling, the encapsulant will slowly dissolve and eventually allow for the primers to be re-suspended into the buffer. A temperature sensitive encapsulant would maintain its integrity until a critical temperature is reached, wherein it is broken down allowing the primers to re-suspend.

Syringe Isolation and Containment

While previous embodiments involved the prevention of cross-contamination from chamber to chamber, the possibility for cross-contamination can occur from one disposable cartridge to another disposable cartridge. For example, the possibility exists that the syringe shaft 26, which is part of the portable diagnostic assay system 10, may be contaminated by a previously used disposable cartridge 20. That is, the shaft 26 which actuates the plunger 28 may be contaminated by assay materials in the syringe barrel 22, i.e., as the shaft wipes against the barrel opening for receiving the shaft 26.

FIGS. 26a-26e depict various configurations of the syringe barrel 22 for preventing cross-contamination between cartridges 20. During a normal syringe actuation, the shaft which drives the plunger 28 is exposed to the outside environment (see FIG. 26a). During this state, it is in theory, possible for trace reagent residue and particulates to be left exposed due to insufficient plunger sealing/scraping and thus risking contamination on the syringe shaft or other areas. In one embodiment, shown in FIG. 26a, a disposable shaft 600 detachably mates with the plunger 28 at one end and removeably mounts to a permanent shaft (not shown) within the portable diagnostic assay system 10. This minimizes the risk of syringe shaft contamination as it is discarded along with the cartridge 20.

In another embodiment, illustrated in FIG. 26b, a disposable shaft 600 passed through a series of elastomer flaps/baffles 610 which function as multiple gaskets. The flexible nature of the elastomer allows the shaft 600 to operate while maintaining intimate contact with the shaft reducing the possibility of exposure.

In another embodiment, depicted in FIG. 26c, a disposable shaft 600 is connected to one end of a flexible bellows 620 which, in turn, mounts at its other end of the syringe barrel 28. As the shaft 600 extends and retract, the bellows 620 expands and collapses This configuration completely isolates the syringe shaft 600 from the internal environment of the syringe barrel 28.

In yet another embodiment, shown in FIG. 26d, the disposable shaft 600 connects to a second plunger 630 disposed a threshold distance X from the primary or working plunger 28. The disposable shaft 600, working plunger 28 and secondary plunger 630 is inserted into a syringe barrel 22 which is elongated by the same threshold distance between the plungers 28, 630. The primary plunger 600 is used as a traditional plunging mechanism and is responsible for moving the fluid into the cartridge. The secondary plunger 630 functions as a containment device and is spaced from the primary plunger 28 such that secondary or containment plunger 630 never passes into the working area (or stroke) of the primary plunger 28. This prevents contaminants from being conveyed to the secondary or containment plunger 630. A permanent shaft 650 extends beyond the elongated syringe barrel 22 where it is mated to the linear actuator or control motor a syringe control motor.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

What is claimed is:

1. A filtration column assembly for use in combination with a disposable cartridge of a diagnostic assay system, comprising:
    a column matrix material configured to filter a fluid sample;
    a tubular column configured to sealably engage a filtration chamber of the disposable cartridge and defining: (i) a column cavity receiving the column matrix material, (ii) a first end having an opening for receiving the fluid sample and configured to retain the column matrix material, and (iii) a second end having an opening to dispense a filtered fluid sample from the column cavity; and
    a cap configured to be inserted into the second end of the tubular column, and define a passageway to direct the sample fluid from the second end of the tubular column into a collection cavity disposed adjacent the filtration chamber.

2. The filtration column assembly of claim 1 wherein the column matrix material is stored in a dry condition prior to use and configured to fill the column cavity of the tubular column upon hydration by the fluid sample.

3. The filtration column assembly of claim 1 wherein the column matrix material is configured to trap a small molecule material while allowing the passage of a large molecule material through the matrix material.

4. The filtration column assembly of claim 3 wherein the small molecule material is sodium and the large molecule material is deoxyribonucleic acid (DNA)).

5. The filtration column assembly of claim 1 wherein the column matrix is configured to remove materials from the group of: phosphates, sodium and polysaccharides.

6. The filtration column assembly of claim 1 wherein the cap restricts the volume of the filtered fluid sample which may collect above the column matrix material due to the effects of surface tension.

7. The filtration column assembly of claim 1 wherein the tubular column includes a filter configured to retain one end of the column matrix material, and wherein the cap includes a filter configured to retain another end of the column matrix material and allows the passage of molecules larger than those trapped by the column matrix material.

8. The filtration column assembly of claim 1 wherein the tubular column includes an effluent opening disposed through a wall of the tubular column, and wherein the cap includes a annular rim and a fluid guide, the annular rim configured to be inserted into the opening in the second end of the tubular column and having an effluent opening aligned with the opening in the wall of the tubular column, the fluid guide receiving the filtered fluid sample from the aligned effluent openings to direct the filtered fluid sample into the collection chamber of the disposable cartridge.

9. The filtration column assembly of claim 8 wherein the annular rim includes an opening in fluid communication with a gap in the tubular column to vent a region between the cap and the column matrix material to facilitate fluid flow through the aligned effluent openings.

10. A disposable cartridge for a portable assay diagnostic system, comprising:
    a filtration chamber in fluid communication with a first port disposed through a wall in the disposable cartridge;
    a collection chamber adjacent the filtration chamber and in fluid communication with a second port disposed through a wall in the disposable cartridge; and
    a filtration column assembly comprising a column matrix material, a tubular column defining a column cavity to receive the column matrix material, and a cap directing a filtered fluid sample from the tubular column into the collection chamber,
    wherein the cap is configured to restrict the volume of the filtered fluid sample collecting above the column matrix material.

11. The disposable cartridge of claim 10 wherein the filtration and collection chambers are separated by a sidewall, wherein the sidewall has a height dimension which is less than the height dimension of the tubular column, and wherein the tubular column is configured to sealably engage the filtration chamber to allow fluid to flow up through the tubular column of the filtration column assembly above the height dimension of the sidewall.

12. The disposable cartridge of claim 10 wherein the tubular column defines a first end configured to retain one end of the column matrix material and an opening for receiving a fluid sample through the first port of the filtration chamber, and a second end having an opening to dispense the filtered fluid sample into the collection chamber, the filtered fluid sample being retrieved through the second port of the disposable cartridge.

13. The disposable cartridge of claim 12 wherein the filtration chamber includes a plurality of raised surfaces to facilitate flow of the fluid sample from the first port into the first end of the tubular column.

14. The filtration column assembly of claim 10 wherein the cap includes a filter configured to retain the other end of the column matrix material and allows the passage of molecules larger than those trapped by the column matrix material.

15. The disposable cartridge of claim 10 wherein tubular column includes a filter configured to retain an end of the column matrix material, and wherein the cap is configured to be inserted into the second end of the tubular column, retain the other end of the column matrix material, and define a passageway to direct the sample fluid from the tubular column into the collection chamber.

16. The disposable cartridge of claim 10 wherein the tubular column includes an effluent opening disposed through a wall of the tubular column, and wherein the cap includes a annular rim and a fluid guide, the annular rim configured to be inserted into the opening in the second end of the tubular column and having an effluent opening aligned with the opening in the wall of the tubular column, the fluid guide receiving the filtered fluid sample from the aligned effluent openings to direct the filtered fluid sample into the collection chamber of the disposable cartridge.

17. The disposable cartridge of claim 8 wherein the annular rim of the cap includes an opening in fluid communication with a gap in the tubular column to vent a region between the cap and the column matrix material facilitating fluid flow through the aligned effluent openings.

18. The disposable cartridge of claim 10 wherein the column matrix material is stored in a dry condition prior to use and configured to fill the column cavity upon hydration by the fluid sample.

19. The disposable cartridge of claim 10 wherein the column matrix material is configured to trap a small molecule material while allowing the passage of a large molecule material through the matrix material.

20. The disposable cartridge of claim 19 wherein the small molecule material is sodium and the large molecule material is deoxyribonucleic acid (DNA)).

* * * * *